(12) United States Patent
Kruse

(10) Patent No.: US 8,059,742 B2
(45) Date of Patent: Nov. 15, 2011

(54) METHOD AND DEVICE FOR OPERATING MIMO AIR INTERFACES IN MOBILE COMMUNICATIONS SYSTEMS

(75) Inventor: Gerhard Kruse, Windhagen (DE)

(73) Assignee: T-Mobile Deutschland GmbH, Bonn (DE)

( * ) Notice: Subject to any disclaimer, the term of this patent is extended or adjusted under 35 U.S.C. 154(b) by 829 days.

(21) Appl. No.: 10/589,055

(22) PCT Filed: Feb. 8, 2005

(86) PCT No.: PCT/EP2005/001250
§ 371 (c)(1),
(2), (4) Date: Oct. 4, 2007

(87) PCT Pub. No.: WO2005/078956
PCT Pub. Date: Aug. 25, 2005

(65) Prior Publication Data
US 2008/0240279 A1    Oct. 2, 2008

(30) Foreign Application Priority Data
Feb. 10, 2004 (DE) .......... 10 2004 006 584

(51) Int. Cl.
  *H04B 7/02* (2006.01)
(52) U.S. Cl. ........ 375/267; 375/295; 375/219; 370/206; 370/208; 405/101
(58) Field of Classification Search ............... 375/295
See application file for complete search history.

(56) References Cited

U.S. PATENT DOCUMENTS

| | | | | |
|---|---|---|---|---|
| 3,603,987 A | * | 9/1971 | Witte | 343/786 |
| 3,836,973 A | * | 9/1974 | Shnitkin et al. | 342/362 |
| 4,723,316 A | * | 2/1988 | Glance | 398/204 |
| 5,090,025 A | * | 2/1992 | Marshall et al. | 375/215 |
| 5,127,066 A | * | 6/1992 | Poggiolini | 385/24 |
| 5,943,372 A | | 8/1999 | Gans et al. | |
| 5,949,762 A | * | 9/1999 | Green et al. | 370/259 |
| 6,049,705 A | | 4/2000 | Xue | |
| 6,181,920 B1 | * | 1/2001 | Dent et al. | 455/101 |
| 6,259,730 B1 | | 7/2001 | Solondz | |
| 6,324,407 B1 | | 11/2001 | Gofron et al. | |

(Continued)

FOREIGN PATENT DOCUMENTS

WO   03/041400   5/2003

OTHER PUBLICATIONS

Waldschmidt, C. et al., "Compact MIMO-arrays based on Polarisation-Diversity", Antennas and Propagation Society International Symposium, vol. 2, pp. 499-502 (Jun. 22-27, 2003).

(Continued)

*Primary Examiner* — Shuwang Liu
*Assistant Examiner* — Lihong Yu
(74) *Attorney, Agent, or Firm* — The Maxham Firm

(57) ABSTRACT

A method and device for operating MIMO air interfaces in mobile communications systems, according to which a radio signal is transmitted by a transmitting device via a MIMO channel comprising a number of m subchannels and is received by a receiving device having n antennas. Different polarizations are assigned to the signals to be transmitted on the subchannels, and the signals are supplied to a common antenna.

35 Claims, 5 Drawing Sheets

U.S. PATENT DOCUMENTS

| | | | |
|---|---|---|---|
| 6,426,723 | B1 | 7/2002 | Smith et al. |
| 6,658,269 | B1 | 12/2003 | Golemon et al. |
| 7,352,688 | B1 * | 4/2008 | Perahia et al. ............... 370/206 |
| 2002/0193146 | A1 | 12/2002 | Wallace et al. |
| 2003/0050020 | A1 * | 3/2003 | Erceg et al. .................. 455/101 |
| 2003/0072382 | A1 | 4/2003 | Raleigh et al. |

OTHER PUBLICATIONS

Examination Report from the German Patent and Trademark Office, 4 pages (Jan. 21, 2005).

International Search Report, 4 pages (Jun. 2, 2005).

* cited by examiner

METHOD AND DEVICE FOR OPERATING MIMO AIR INTERFACES IN MOBILE COMMUNICATIONS SYSTEMS

FIELD OF THE INVENTION

The invention relates to a method and a device for operating of MIMO air interfaces with mobile communications systems.

DISCUSSION OF PRIOR ART

MIMO (multiple input multiple output) systems are promising new radio transfer techniques for future generations of mobile radios "Beyond 3G." With MIMO systems, one or more HR-modulated signals are beamed on the radio transmission path by a number m of MI antennas and received by a number n of MO antennas. A MIMO channel is therefore construction of m transmission antennas, n reception antennas, and a multiplicity of what are generally time variable sub channels between the transmission and reception antennas which are comprised of diversity channels. By way of example, FIG. 1 presents a mobile radio contact with base station 1 that essentially contains a modulator/demodulator for the data source/sink, a MIMO processor and an HR transmitter/receiver stage, three antennas 2 fed by signal exits A, B, C, mobile station 3 with basically the same elements as base station 1, two MO antennas 4 and sub channels 5. If the sub channels are statistically independent, the likelihood increases that the transmission signal is to be faultlessly received with the number of the antennas. For an optimal combination of MIMO sub channels realized with MIMO processors, various methods and algorithms, both on the transmitter and receiver end, are known, for example, as in International patent publication WO 03/041300 A 1.

The advantages of MIMO methods consist in a clearly more efficient frequency utilization over previous methods (for example, 2G, 3G), a reduced EMVU load through fewer transmission performances, as well as high robustness against fading, see, for example, BLAST (Bell Labs Layered Space Time) technology. To their advantage, MIMO systems are applied to orthogonal multiple access methods such as CDMA, TDMA, FDMA, or combinations of these.

Optimal results are gained with MIMO in the Rayleigh channel, that is, reception only through spread. The effectiveness of MIMO systems is based on the statistical independence of the MIMO sub channels.

U.S. patent application publication 2003/0072382 A1 describes a space-time-communications system for operating MIMO air interfaces in which a radio signal is sent out over one of a number of sub channels, including a MIMO channel of a transmitting device, and is received by a receiving device, whereby the radio signals that are to be sent out and received on the sub channels are assigned different polarizations. Here, too, an antenna is required for each radio signal of a sub channel.

U.S. Pat. No. 6,658,269 B1S and EP patent 1 003 297 A2 reveal wireless communication systems with a diversity antenna system, with which several radio signals of different polarizations are emitted. Thereby each differently polarized radio signal is assigned to precisely one antenna in the system of antennas.

SUMMARY OF THE INVENTION

The present invention involves MIMO air interfaces, specifically antennas. Given reciprocity of the radio channel, the same circumstances apply for the reverse transmission direction.

Densely neighboring antennas with the same polarization have a high correlation of the broadcasted or received signals with the complex correlation factor r. In order to achieve significant decorrelations by means of space diversity with, for example, $|r|<0.2$, with conventional mobile radio fixed station antennas with vertical polarization and opening angles of 60° on the horizontal level and 20° on the vertical level, antenna spacings of more than approximately 20 λ horizontally and more than approximately 3 λ vertically are necessary. Space diversity necessitates large measurements and is therefore less suitable for mobile devices.

Polarization diversity methods offer one solution. For MIMO systems, these are, for example, published in International patent publications WO 02/058187 A1 and WO 02/099995 A2, and U.S. Pat. No. 6,049,705 (here specifically for mobile radio equipment).

The described transmission equipment works with unchanged orthogonal polarization of the individual MI and MO antennas. These arrangements have the disadvantage that an antenna is required for each MIMO sub channel.

It is the task of an embodiment of the invention to provide a method and an arrangement for operating air interfaces in mobile communications systems in which the space required for antennas and the decorrelation of the sub channels on the air interface are clearly improved.

The claimed invention is distinguished at least by the fact that different polarizations are assigned to the signals to be transmitted and received on the sub channels, and the signals are supplied to a common antenna.

In a preferred design of an embodiment of the invention, an antenna array with spatially narrowly neighboring partial antennas is used as an antenna, in the exemplary embodiment, a cross dipole. Preferably, the phase centers of the component antennas coincide.

The assignment of the polarizations of the signals sent out on the sub channels is preferably governed by a control facility. Its polarizations sent out on the sub channels at predetermined intervals are thereby altered, preferably synchronically altered. One possibility is to exchange the polarizations of the signals sent out on the sub channels among themselves in predetermined intervals.

It can also be anticipated, however, that for each signal sent out on the sub channels one out of a volume of predetermined polarizations is in each case to be assigned a polarization selected by chance. Thus, no polarization can be assigned in duplicate.

In the event that the radio signal sent out on the MIMO channel is modulated by a digital multithread, the polarization exchange is directed such that the polarizations of the signals sent out on the sub channels for the duration of at least one bit of this multithread remain the same. The polarization exchange can, however, also be controlled in such a way that the polarizations of the signals sent out on the sub channels shift one bit of the multithread at least once during the period.

The control facility assumes influence of the polarization of the signals sent out on the sub channels through corresponding facilities such as phase modifiers, delay lines, or power splitters, whereby the polarizations are determined via the relationship of the amounts of their performances a as well as (1−a), and/or their mutual phase situation and/or their time disalignment $t_1$, $t_2$ is decided. The number of the switchable polarizations must be at least as large as the number m sub channels.

According to embodiments of the invention, with one antenna each, which can send and receive several polarizations simultaneously, many uncorrelated MI and MO sub channels will be realized. The advantage of the MIMO method, which until now was achieved only by several spatially distributed antennas, is obtained according to embodiments of the invention with only one antenna.

Preferably, the amounts of the timewise averaged correlation factors $\underline{r}$ of the MIMO channels can be reduced since the polarizations of the antennas are constantly being altered, whereby the polarizations with a digitally modulated radio signal:
  remain the same over at least one bit, or
  shift at least once per bit.

If the sub channels are CDMA channels, the polarization shift refers to one chip.

BRIEF DESCRIPTION OF THE DRAWING

The objects, advantages and features of the invention will be more clearly perceived from the following detailed description, when read in conjunction with the accompanying drawing, wherein.

DETAILED DESCRIPTION OF THE PREFERRED EMBODIMENTS

According to embodiments of the invention, the decorrelation of the sub channels of a MIMO radio signal is obtained by polarization decoupling. The polarization of an even electromagnetic wave is generally sinistrorotary or dextrorotary elliptically, in special cases linearly or circular. The rotational direction of the polarization is right-turning as defined by the IEEE if the peak of the electric field vector turns clockwise as viewed from the transmitter. The temporal dependence of the electric field vector underlies this definition at a fixed position.

Figure 1:
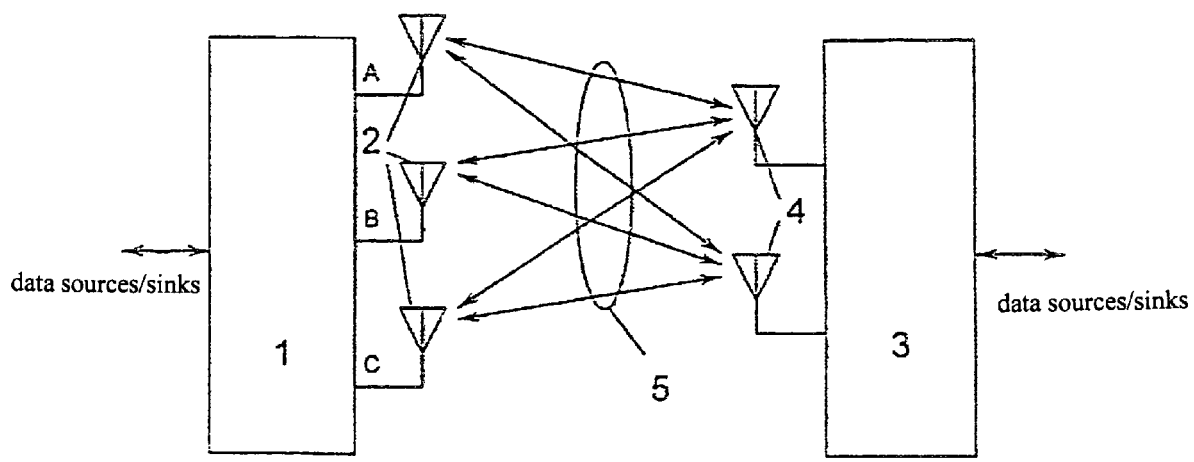
FIG. 1, is a schematic diagram showing the general installation of a MIMO communications system according to the current state of the technology.

The radio signals A, B, C from radio equipment 1 in accordance with FIG. 1 are conducted on only one antenna, instead of on several antennas, which superpositions and emits the signals with m different polarizations. Economization is thereby obtained by spatially offset antennas. The antenna consists of an antenna array with several partial antennas lying spatially densely together.

Figure 2:
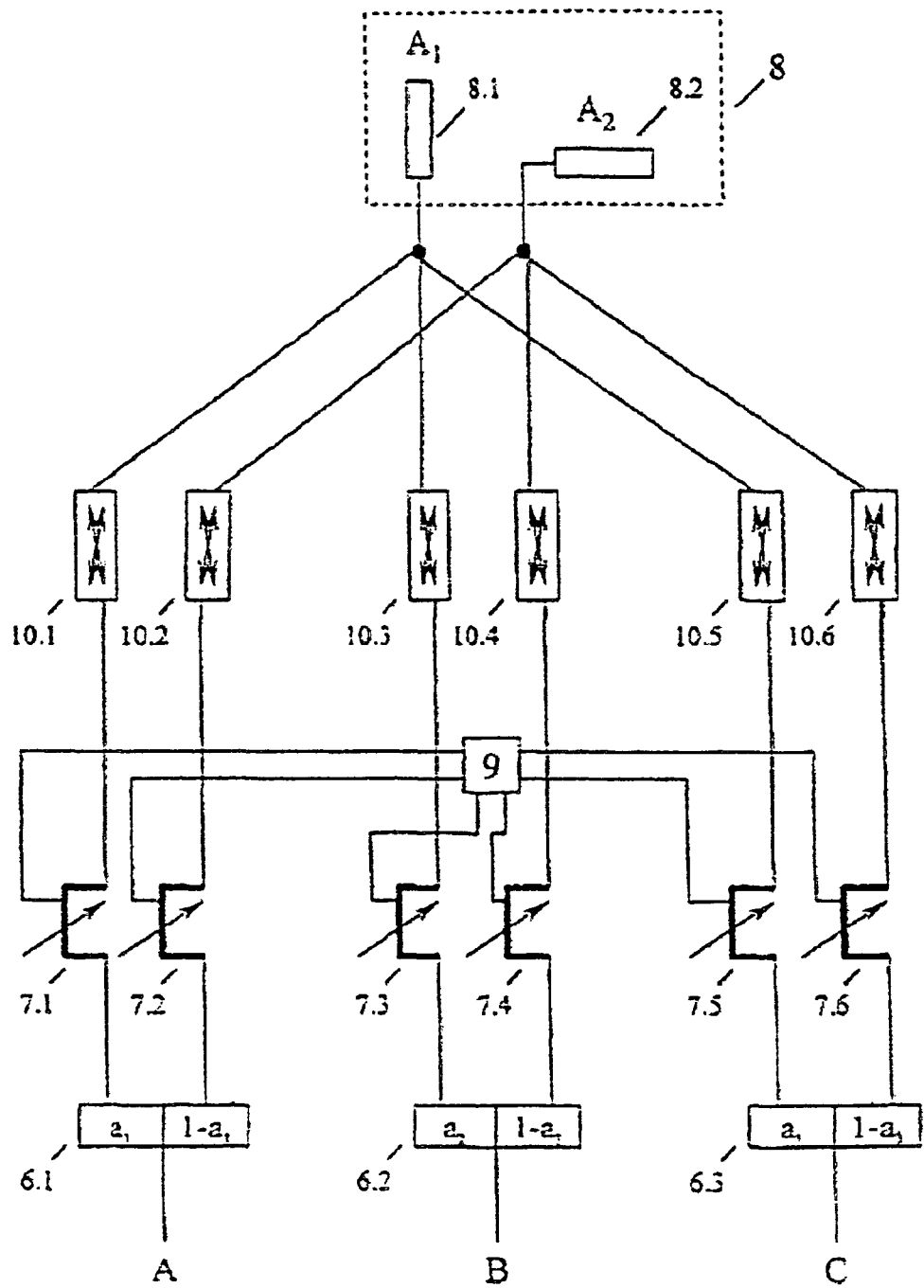
FIG. 2 is a schematic diagram of an installation of an MIMO communications system according to the invention.

In the exemplary embodiment according to FIG. 2, the MI radio signals A, B, C of the radio equipment 1 shown in FIG. 1 are assigned with power splitters 6.1 to 6.3 on two branches each with the standardized performances $a_i$ and $(1-a_i)$ with $0 \leq a_i \leq m$. Both dispatcher exits of each MI sub channel with the performances $a_i$ and $(1-a_i)$ are delayed by the times $t_i1$ and $t_i2$ by means of delay lines 7.1 to 7.6 that can consist of, for example, switchable management pieces or phase modifiers. Through one exponential lag, each in both branches of an MI sub channel, whereby in general $t_i1=0$ or $t_i2=0$, the wave can jump in each branch alternatively, whereby left or right turning polarization is generated with the antenna 8.

According to the adjustment values of $a_i$, $t_i1$ and $t_i2$, waves can be transmitted with any situation and direction of rotation of the polarization ellipse, including degeneracy to the rectilinear.

In order to avoid the mutual repercussion of the MI sub channels, the two branches for each MI channel are led over the directional coupler 10.1 to 10.6 on the antenna. The waves from the branches of directional couplers 10.1, 10.3 and 10.5 are, for example, overlaid in a linearly polarized partial antenna A1. The waves from the branches of directional couplers 10.2, 10.4 and 10.6 are in partial antenna A2 with orthogonal polarization. The partial antennas A1 and A2 are very densely neighboring and form an antenna array. Preferably, the phase centers of the partial antennas coincide. As antennas, linearly or circularly polarized antennas with orthogonal polarization or horn emitters with a suitable mode of stimulation can be used.

The change over of polarization of the MI antenna takes place over several bits or several times per bit and is governed by a control facility 9.

For the shift of polarization, two algorithms are preferably provided:
  1. Synchronous, cyclical change over of all Ml channels (polarization of MI channel A is switched to MI channel B after a turn-around period: polarization of MI channel B is switched to MI channel C, etc.); or
  2. Polarization of the MI channels are generated by chance.

The polarizations of the MI sub channels can, for example, be horizontally, vertically, linearly, with polarization under 45° and 135° to the ground, circularly left/right rotation, elliptically left/right rotation (with selectable axis relationship and situation to the ground), among others. The number of the switchable polarization conditions should be at least as large as the number m of the sub channels.

Figure 3:
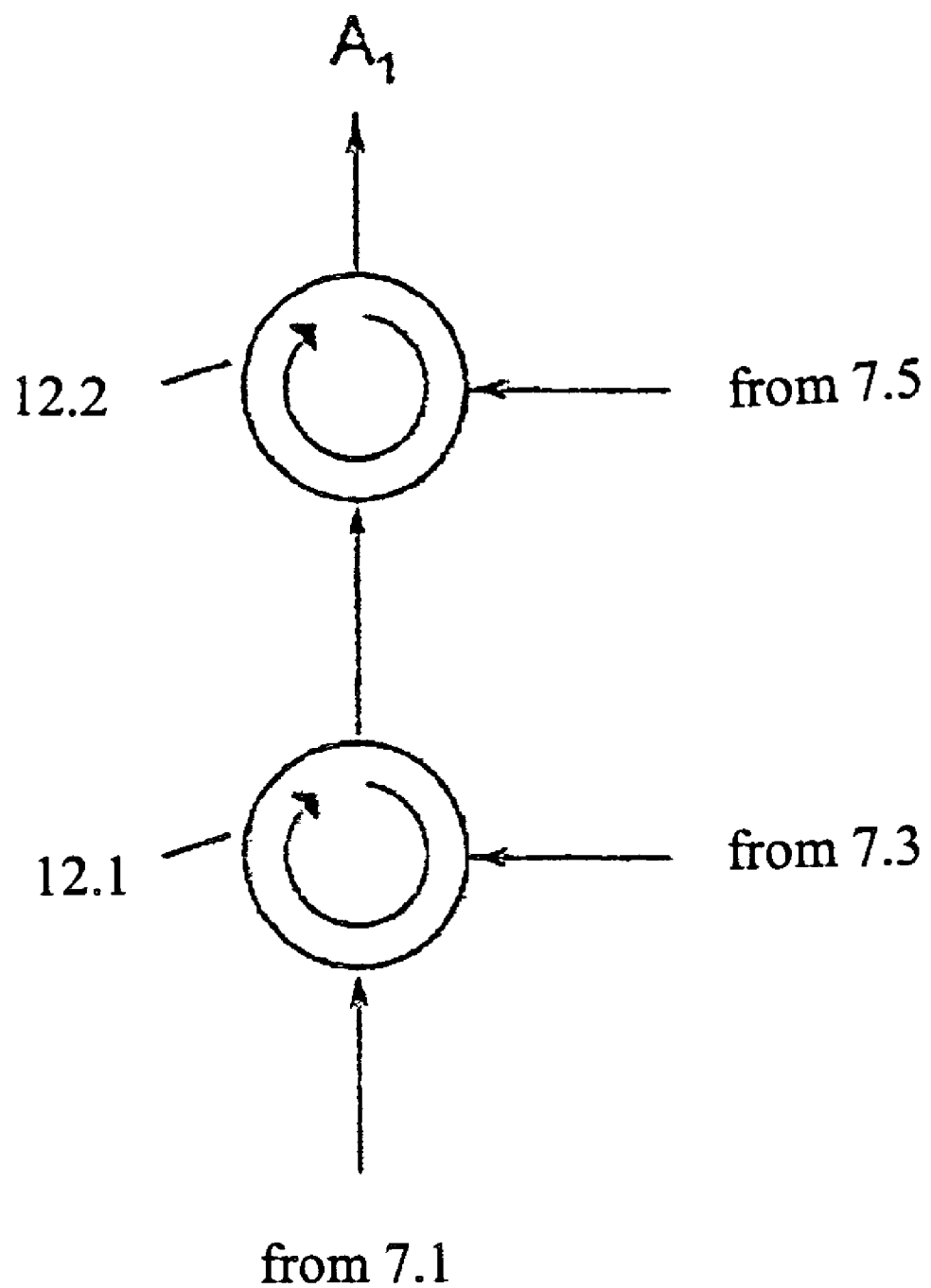
FIG. 3 shows the application of Y circulator at the installation in accordance with FIG. 2.

In order to avoid the mutual retroaction of the MI sub channels, both branches for each M1 channel are conducted to the antenna via directional coupler 10.1 through 10.6 on the antenna parts A1 and A2. Alternatively, with two M1 channels, two Y circulators and for m>2 cascaded Y circulators can be used for the interconnection of the MI antennas (FIG. 3).

Figure 4:
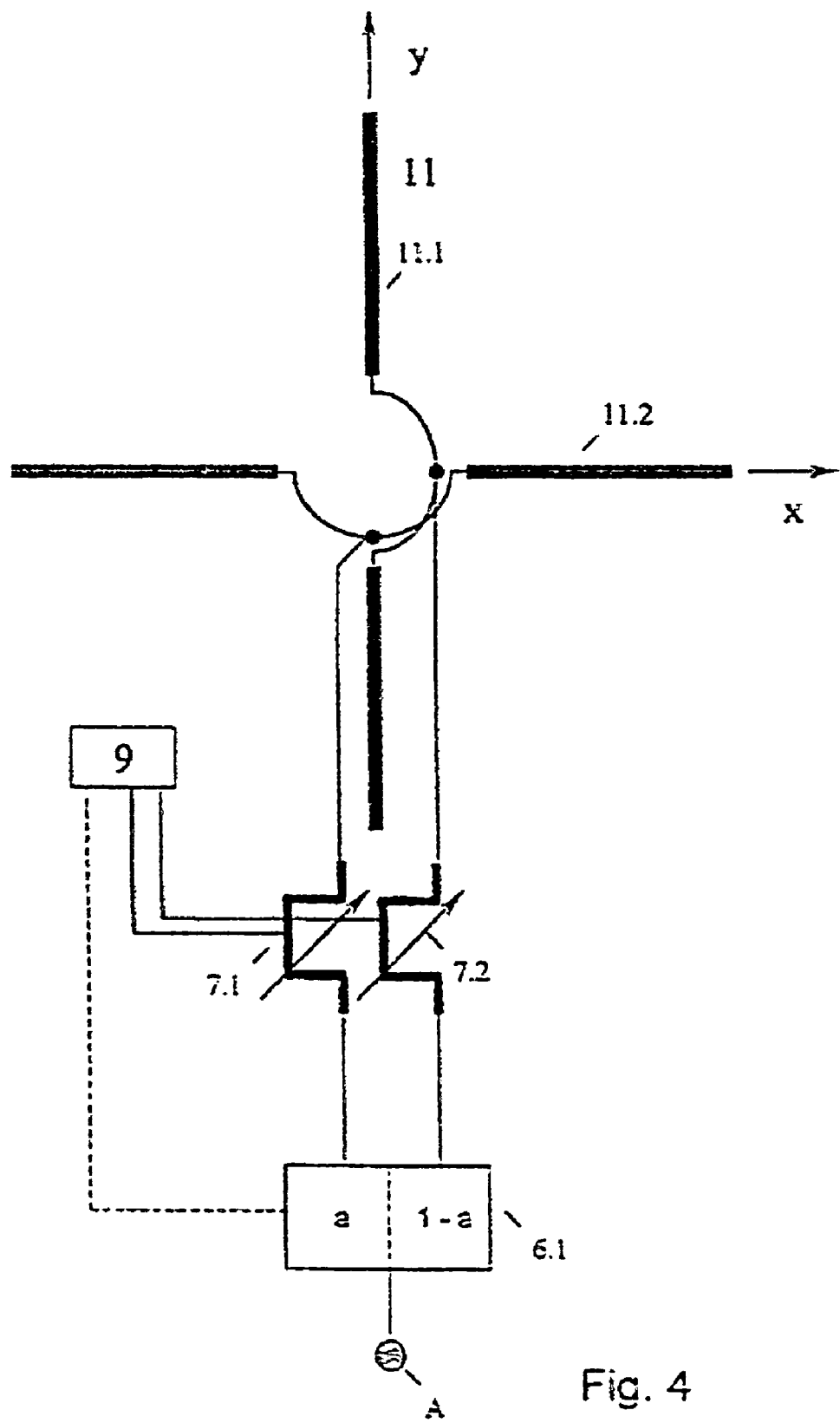
FIG. 4 shows a special exemplary embodiment of a MIMO communications system according to the invention with utilization of a cross dipole.

As an exemplary embodiment of the decorrelation of MI sub channels with an antenna may be a cross dipole 11 considered as a simple exemplary embodiment in FIG. 4. A cross dipole is considered as an interconnection of two linearly polarized, orthogonal dipoles 11.1 and 11.2, whose phase centers coincide.

As a directional antenna, the cross dipole can be arranged in front of a reflector. Dipoles have the advantages:
  of a simpler constructive installation; and
  broadband ability via appropriate design of the dipoles (for example, a ratio of diameter/length with cylindrical dipoles).

The performance of a transmitter 1 is divided up in power splitter 6.1 (compare also, FIG. 2) on the shares of power a and $(1-a)$ apportioned. After the delay of the two signal components by $t_1$ and/or $t_2$ in delay lines 7.1 and 7.2, the signals are conducted on the two dipoles 11.1 and 11.2. With practical implementations, the total length of a dipole generally amounts to approximately $\lambda/2$.

Figure 5:
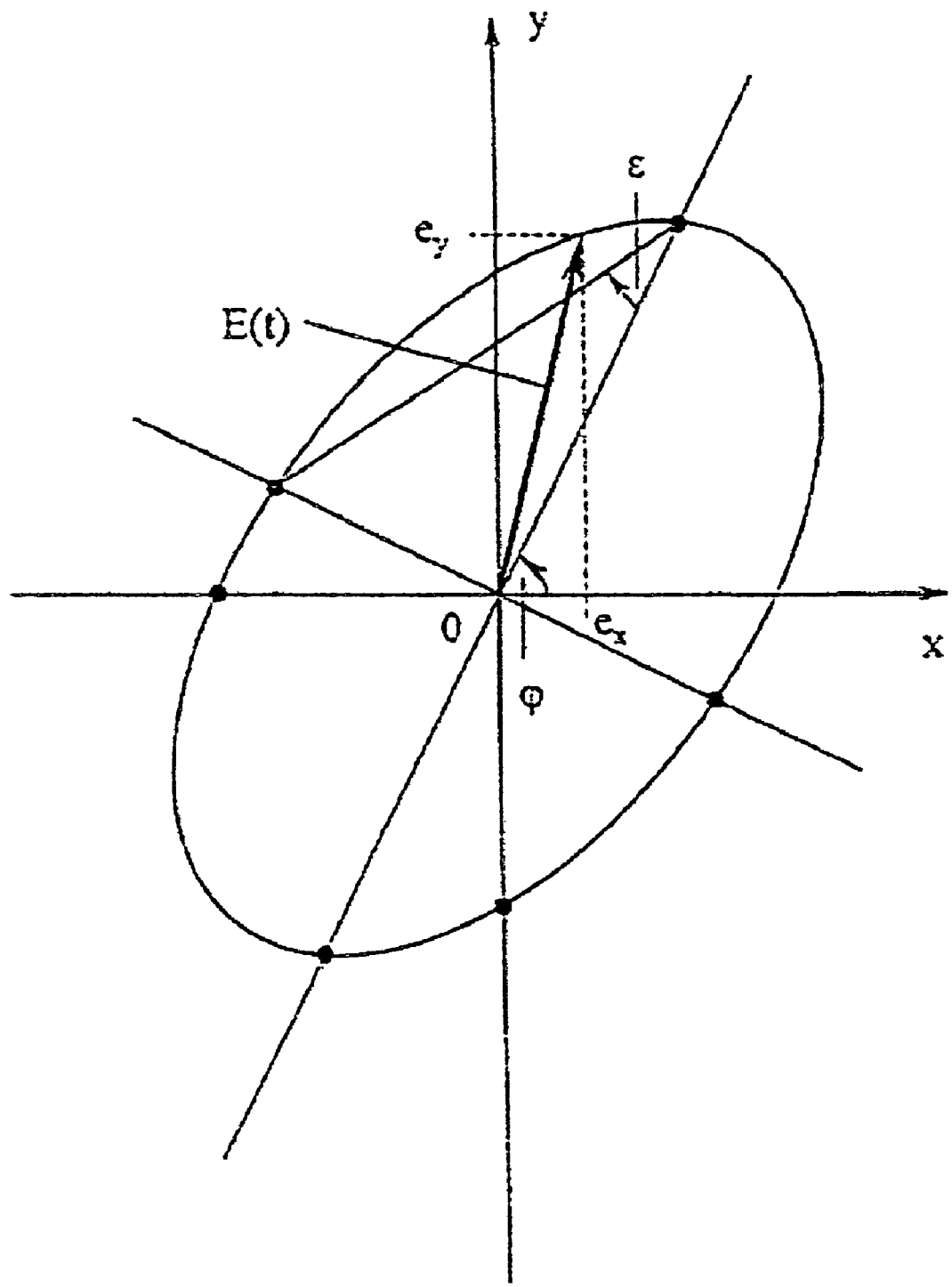
FIG. 5 shows a representation of the electric field of the wave of a cross dipole that is expanding in the direction z, that is vertical with respect to the level of the dipole, as used in an embodiment of the invention.

The electric field of a wave of the cross dipole 11 extending in the direction z, that is, vertically to the dipole level, is described by the two-dimensional vector according to FIGS. 4 and 5:

$$\underline{E}(t) = \underline{e_x} \cdot a \cdot \cos(\omega \cdot t - k \cdot z + \delta_x) + \underline{e_y} \cdot (1-a) \cdot \cos(\omega \cdot t - k \cdot z + \delta_y)$$

with the wave number $k = 2\pi/\lambda$, and the phase $\delta = 2 \cdot \pi \cdot c \cdot \tau_i / \lambda$ The following polarizations of MIMO antennas in Table 1 are, for example, possible with alignments $t_1$, $t_2$ and a (see, for example: Kraus, John D.: "Antennas," 1950, and Schrott/Stein: "Meaning and Description of the Polarization of Electromagnetic Waves," 1980,):

TABLE 1

| | | | | | a | | | | |
|---|---|---|---|---|---|---|---|---|---|
| 1 | 0 | 0·5 | 0·5 | <1 | <1 | 0·5 | 0·5 | 0·5 | 0·5 |
| $t_1$ bel | bel | λ/4·c | 0 | λ/4·c | 0 | λ/2·c | 0 | <λ/2·c | 0 |
| $t_2$ bel | bel | 0 | λ/4·c | 0 | λ/4·c | 0 | 0 | 0 | <λ/2·c |
| Pol hor | vert | zir-re | zir-li | ell-re | ell-li | 45° | 135° | ell-re | ell-li |

(Pole = Polarization; bel = any; hor = horizontal; vert = vertical; zir-li = left-circular; zir-re = right-circular; ell-li = elliptically sinistrorotatory; ell-re = elliptically dextrorotatory; 45° = linearly below 45° to the ground; 135° = idem. under 135°)

The orientation angle φ of the elliptical main axis with respect to the ground amounts to:

$$\tan 2\phi = 2a(a-1)/(a^2-(1-a)^2)\cdot \cos \delta$$

with the phase of the polarization relationship $\delta = \beta_y - \beta_x$.

The ellipticity angle as a measurement for the axis relationship of the ellipse (tangents of the axes) is defined by:

$$\tan 2\delta = \tan \delta \cdot \sin 2\phi.$$

Thereby the form and situation of the polarization ellipse is established by a and $\tau_i$.

It is advantageous that elliptical polarizations can be governed both by the division a and (1−a) of the transmission performance and the delay times $\tau_i$ (phase situation) of the signal, as well as, in narrower limits, only by τ, if 0<a<1 is selected (see Table 1).

The invention claimed is:

1. A method for operating MIMO air interfaces in mobile communication systems, the method comprising:
    transmitting from a transmitting device radio signals over a MIMO channel comprising a number of m sub channels;
    receiving the radio signals in a receiving device;
    splitting the radio signal to be transmitted and received on each sub channel into two partial signals, the ratio of the two partial signals being predetermined, each partial signal having a signal flow path;
    assigning a different polarization to each partial signal of the radio signal of each sub channel by inserting a delay line into the signal flow path of said partial signal;
    superimposing the radio signals of all partial signals of all sub channels; and
    mutually conducting the superimposed radio signals to a common antenna array, the antenna array comprising several spatially closely adjacent partial antennas.

2. The method according to claim 1, wherein the partial antennas have phase centers which coincide.

3. The method according to claim 1, and further comprising governing the assignment of the polarizations of the radio signals sent out on the sub channels by a control facility.

4. The method according to claim 2, and further comprising governing the assignment of the polarizations of the radio signals sent out on the sub channels by a control facility.

5. The method according to claim 1, and further comprising altering the polarizations of the signals sent out on the sub channels in predetermined intervals of time.

6. The method according to claim 2, and further comprising altering the polarizations of the signals sent out on the sub channels in predetermined intervals of time.

7. The method according to claim 3, and further comprising altering the polarizations of the signals sent out on the sub channels in predetermined intervals of time.

8. The method according to claim 1, and further comprising synchronically altering the polarizations of the signal sent out on the sub channels.

9. The method according to claim 2, and further comprising synchronically altering the polarizations of the signal sent out on the sub channels.

10. The method according to claim 3, and further comprising synchronically altering the polarizations of the signal sent out on the sub channels.

11. The method according to claim 1, and further comprising exchanging among each other in predetermined intervals of time the polarizations of the signals sent out on the sub channels.

12. The method according to claim 2, and further comprising exchanging among each other in predetermined intervals of time the polarizations of the signals sent out on the sub channels.

13. The method according to claim 1, and further comprising assigning to each signal sent out on the sub channels a polarization selected by chance from a volume of predetermined polarizations.

14. The method according to claim 2, and further comprising assigning to each signal sent out on the sub channels a polarization selected by chance from a volume of predetermined polarizations.

15. The method according to claim 1, and further comprising:
    sending at least some of the radio signals that are sent out on the MIMO channel by a means of digital multithread; and
    modulating the radio signals sent out by means of the digital multithread, whereby for the duration of at least one bit of the multithread the polarizations of the signals sent out on the sub channels remain same.

16. The method according to claim 2, and further comprising:
    sending at least some of the radio signals that are sent out on the MIMO channel by a means of digital multithread; and
    modulating the radio signals sent out by means of the digital multithread, whereby for the duration of at least one bit of the multithread the polarizations of the signals sent out on the sub channels remain same.

17. The method according to claim 1, and further comprising:
    sending at least some of the radio signals that are sent out on the MIMO channel; and
    modulating those radio signals by a digital multithread, whereby the polarizations of the signals sent out on the sub channels change at least once during the duration of at least one bit of the multithread.

18. The method according to claim 2, and further comprising:

sending at least some of the radio signals that are sent out on the MIMO channel; and modulating those radio signals by a digital multithread, whereby the polarizations of the signals sent out on the sub channels change at least once during the duration of at least one bit of the multithread.

19. The method according to claim 1, and further comprising determining the polarization of the signals sent out on the sub channels by the relationship of the amounts of its performances a and/or (1−a) and/or its mutual phase situation and/or its time offset ($t_1$, $t_2$).

20. The method according to claim 2, and further comprising determining the polarization of the signals sent out on the sub channels by the relationship of the amounts of its performances a and/or (1−a) and/or its mutual phase situation and/or its time offset ($t_1$, $t_2$).

21. The method according to claim 1, wherein the polarizations are switchable and the number of switchable polarizations is at least as large as the number m of sub channels.

22. The method according to claim 2, wherein the polarizations are switchable and the number of switchable polarizations is at least as large as the number m of sub channels.

23. A device for operating MIMO air interfaces in mobile communications systems, the device comprising:
   a transmitting device for transmitting radio signals over a MIMO air interface comprised of a number m of sub channels;
   a receiving device for the reception of the radio signals;
   facilities for splitting the radio signal on each sub channel into two partial signals and for the assignment of different polarizations to each partial signal of the radio signals that are to be sent out and received on the sub channels, said facilities including signal flow paths for each said partial signals and delay lines inserted into the signal flow paths which enable the active assignment of polarizations to each said partial signal;
   means for superimposing all of the radio signals with differently assigned polarizations from the sub channels; and
   an antenna array constructed from several spatially closely adjacent partial antennas to which the superimposed radio signals are conducted.

24. The device according to claim 23, wherein the partial antennas have phase centers which coincide.

25. The device according to claim 23, wherein the antenna is a cross dipole.

26. The device according to claim 24, wherein the antenna is a cross dipole.

27. The device according to claim 23, wherein said facilities comprise means to change the phase situation and/or the time delay (t) of the radio signals.

28. The device according to claim 24, wherein said facilities comprise means to change the phase situation and/or the time delay (t) of the radio signals.

29. The device according to claim 25, wherein said facilities comprise means to change the phase situation and/or the time delay (t) of the radio signals.

30. The device according to claim 23, wherein said facilities comprise means for dividing the radio signal into several partial signals of various performance a and 1−a.

31. The device according to claim 24, wherein said facilities comprise means for dividing the radio signal into several partial signals of various performance a and 1−a.

32. The device according to claim 25, wherein said facilities comprise means for dividing the radio signal into several partial signals of various performance a and 1−a.

33. The device according to claim 23, and further comprising a control facility to control the installations.

34. The device according to claim 24, and further comprising a control facility to control the installations.

35. The device according to claim 25, and further comprising a control facility to control the installations.

* * * * *